United States Patent [19]
Bozanic et al.

[11] 3,878,529
[45] Apr. 15, 1975

[54] MATCHED FILTER FOR RADAR UTILIZING SPIN-ECHO TECHNIQUES

[75] Inventors: Donald A. Bozanic; Dickron Mergerian, both of Baltimore; Ronald W. Minarik, Lutherville, all of Md.

[73] Assignee: Westinghouse Electric Corporation, Pittsburgh, Pa.

[22] Filed: Jan. 26, 1973

[21] Appl. No.: 327,025

[52] U.S. Cl.......... 343/5 R; 324/0.5 R; 340/173 NI; 343/100 CL
[51] Int. Cl.............................................. G01s 9/02
[58] Field of Search....... 343/5 R, 100 CL, 17.2 PC; 324/0.5 R, 0.5 A; 340/173 NI

[56] References Cited
UNITED STATES PATENTS

| | | | |
|---|---|---|---|
| 3,147,427 | 9/1964 | Varian | 324/0.5 A |
| 3,577,145 | 5/1971 | Worden et al. | 343/17.2 PC |
| 3,663,952 | 5/1972 | Bozanic et al. | 324/0.5 R |

OTHER PUBLICATIONS
M. I. Skolnik, Radar Handbook, McGraw-Hill, 1970, pp. 20-21 to 20-26.

*Primary Examiner*—Maynard R. Wilbur
*Assistant Examiner*—G. E. Montone
*Attorney, Agent, or Firm*—J. B. Hinson

[57] ABSTRACT

A matched filter for providing correlation between an RF coded radar pulse and the target return signal by means of a plurality of spin-echo elements which are sequentially range gated "on" for a time substantially equal to the radar pulse length during the target signal return time after having been "set" during the radar pulse transmission time so that the noise occurring within the RF signal bandwidth is incident during one but not more than two consecutive range gate time periods with the resulting effect that noise is reduced to the point where it has the same effect as it does upon conventional matched filters utilized for radar applications.

8 Claims, 3 Drawing Figures

MATCHED FILTER FOR RADAR UTILIZING SPIN-ECHO TECHNIQUES

CROSS REFERENCE TO RELATED APPLICATION

This invention is related to U.S. Ser. No. 173,491 now U.S. Pat. No. 3,829,760, entitled "Spin Echo Frequency Hopping," Donald A. Bozanic, et al., filed on Aug. 20, 1971 and U.S. Ser. No. 33,201 now U.S. Pat. No. 3,775,670, entitled "High Bandwidth-Time Product Spin Echo System," Donald A. Bozanic, et al., filed on Apr. 30, 1970. This invention is also assigned to the assignee of the present invention.

BACKGROUND OF THE INVENTION

1. Field of the Invention

The subject invention is directed to a time varying range gate spin-echo matched filter for radar applications which utilizes a paramagnetic sample located in microwave transmission line means operated at cryogenic temperatures and more particularly to spin-echo systems operating with a paramagnetic sample preferably comprised of titanium dioxide (rutile) doped with nickel wherein the crystalline electric field of the rutile splits the energy level of the nickel at a predetermined frequency and spin-echo signals are produced without the requirement of an external magnetic field.

The spin-echo phenomenon normally exists when a paramagnetic sample is located in a resonant cavity situated between a homogeneous DC magnetic field such that when an input RF pulse having a frequency equal to the characteristic or "Larmor" frequency of the sample is applied at right angles to the DC magnetic field, a torque is applied to the magnetic moment which causes it to be tipped away from the direction of the magnetic field. The angle of tipping, that is the angle between the moment and the direction of the field, is proportional to the magnitude of the field and the time during which the RF pulse exists. Upon release of the displacing force, the spinning electrons urged again toward realignment by the force of the magnetic field rotate or precess about the field in much the same manner as a tipped gyroscope. When the sample is subsequently subjected to another RF pulse also directed transversely to the magnetic field, the samples spontaneously develops a magnetic field of its own which is also normal to the magnetic field and which rotates about the latter's direction. The strength of the rotating field builds up to a maximum and then decays, which is then detected as an electrical output signal called a "spin-echo" signal.

2. Description of the Prior Art

Spin-echo systems are well known to those skilled in the art and additionally a system for the generation of a spin echo signal without the need for an external magnetic field is disclosed in U.S. Pat. No. 3,671,855 entitled "Broadband Zero Field Exchange Echo System," Donald A. Bozanic, et al., which issued on June 20, 1972. This patent disclosed a system utilizing a paramagnetic sample such as rutile doped with iron group transition metal ions, having magnetic defect centers in the order of $1 \times 10^{19}$ to $1 \times 10^{21}$ defects centers/cm$^3$. Moreover, the use of a spin echo system as a matched filter element in a pulsed radar system is disclosed in the aforementioned related application U.S. Ser. No. 173,491. In this system, a pulse diversity radar system is disclosed wherein a relatively small portion of the radar transmitted pulse is fed into a matched filter element comprised of a single spin-echo device. This signal is then "set" by a locally generated wideband post-set pulse which in so doing automatically matches the filter to the radar pulse. After a predetermined later time, the radar receiver is then gated "on" and when the reflected radar pulse is received and fed into the spin-echo device a correlation echo "spike" possessing the bandwidth of the radar pulse is generated as it would be for a typical matched filter. An inherent problem exists, however, in that during the time the receiver is gated on, there is a thermal noise within the RF signal bandwidth which is incident upon the spin-echo element which has an erasure effect upon the memory. Also there will be a certain amount of noise power which is leaking through the radar video detector which can mask the echo signal.

SUMMARY

The present invention has for its object reducing the noise problem associated with a spin-echo matched filter in the radar system to the point where it has essentially the same effect as it does upon conventional matched filters. This is accomplished by employing a bank or plurality of spin-echo matched filter elements which are all simultaneously fed a portion of the radar transmitter pulse and set by a post-set pulse generated a short time thereafter. Waveguide coupling means including respective switch devices controlled from a timing circuit operated in synchronism with the radar synchronizer feed these signals to the spin-echo elements. During the radar receive time, each spin-echo element is sequentially switched on, i.e. coupled to the radar antenna, for a respective time period or range gate substantially equal to the radar pulse length whereupon the radar return signal will appear in one but not more than two consecutive time periods. A correlation spin-echo signal triggered by the radar return pulse will be produced after the respective spin element has been decoupled from the antenna, resulting in the correlation echo signal occuring when the noise signal is turned off.

DESCRIPTION OF THE PREFERRED EMBODIMENT

Figure 1:
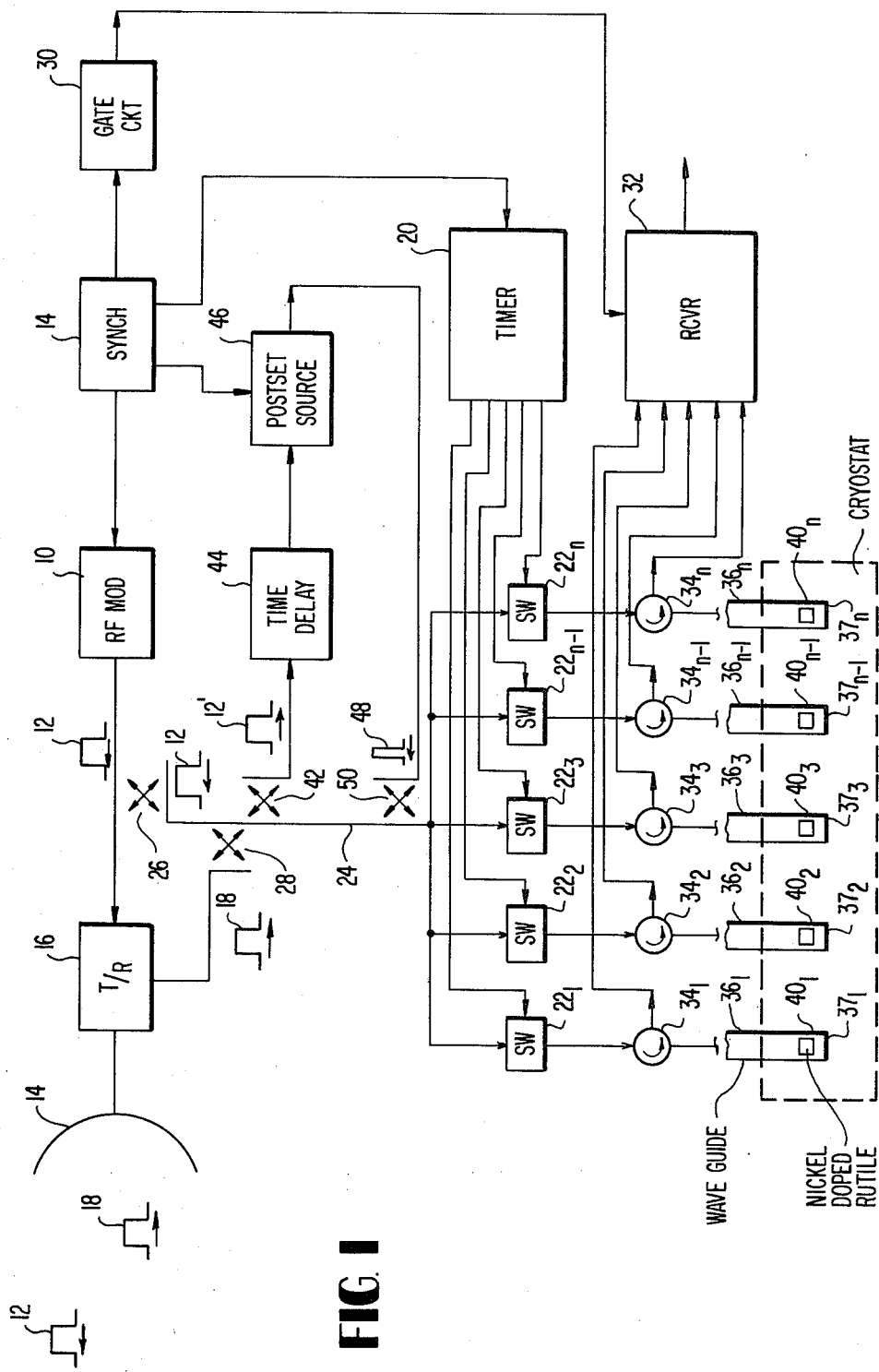
FIG. 1 is a block diagram illustrative of the preferred embodiment of the subject invention.

Referring now to the drawings and more particularly to FIG. 1, there is disclosed the RF section of a pulse radar which includes for purposes of illustration, a radar modulator 10, which is adapted to generate a train of RF coded pulses 12 which may be for example "chirped" from trigger signals coupled thereto from a master timer or synchronizer 14 which controls the pulse repetition frequency (PRF) of the system. A chirped signal is one which is linearly varied in frequency i.e. ramped over a predetermined frequency range. The radar pulse 12 is radiated from a suitable antenna assembly 14 after having been fed through a transmit-receive (T/R) device 16. After the transmitted pulse is reflected from a target, not shown, it appears as a return signal 18.

The synchronizer 14 in addition to controlling the RF modulator 10, feeds a control signal to a second timer circuit 20 which is turn controls a plurality of microwave switches $22_1$, $22_2$, $22_3$, $22_{n-1}$ and $22_n$. These switches are coupled to a microwave transmission line or waveguide 24 which is adapted to conduct a portion of the transmitted pulse 12 coupled thereto by means of a microwave coupler 26. The received radar return signal 18 is also coupled to the waveguide 24 by means of the microwave coupler 28 connected to the T/R device 16. The synchronizer 14 also applies a control signal to a gate circuit 30 which controls the radar receiver 32. The radar receiver is adapted to receive respective inputs in the form of correlation echo signals from microwave circulators $34_1$, $34_2$, $34_3$, $34_{n-1}$ and $34_n$. Each circulator $34_1$, $34_2$, etc. has one port coupled to a respective microwave switch $22_1$, $22_2$ etc. with the remaining port being coupled to a respective waveguide element $36_1$, $36_2$, etc. which have terminations or shorts 37, etc. These terminations are located in a cryostat 38 for operation at cryogenic temperatures and form microwave cavities wherein spin-echo samples $40_1$, $40_2$ . . . $40_n$ are placed. The spin-echo samples are preferably comprised of nickel doped titanium dioxide commonly referred to as rutile, having the following properties: (a) the host material contains no nearest-neighbor elements to the echo producing paramagnetic defect which possess nuclear spins; (b) the resonance transition of the paramagnetic defect permits zero magnetic field operation at some microwave operating frequency thereby permitting relatively high bandwidth time (BT) products to be achieved; (c) the phase memory time can be controlled by the doping concentration; and (d) the material exhibits a spin lattice relaxation time comparable to the memory cycle repetition period obtained in conventional memory systems. It is not desired that the present invention be limited to such materials since when desirable rutile doped with iron group transition metal ions can be used without the need for an external magnetic field. Also other types of paramagnetic materials can be utilized but in combination with the well known homogeneous DC field.

In addition to the apparatus described above, the embodiment shown in FIG. 1 also includes a microwave coupler 42 coupled to the microwave transmission line 24 for sampling a portion of the radar pulse 12 coupled to the transmission line 24 by means of the microwave coupler 26. The sampled RF comprises the pulse 12' which is fed to a delay line 44 or some such device. The output of the time delay circuit 44 is coupled to a second RF pulse source 46 which is adapted to locally generate a relatively narrow wideband RF post-set pulse 48 after a predetermined time delay $t_r$ after the transmission of the radar pulse 12.

The subject invention is adapted to provide a time varying range gated spin-echo matched filter system for providing signal correlation in radar applications. It is well known to those skilled in the art of spin-echo technology that a spin echo signal is generated when a pair of microwave pulses corresponding to the "input" pulse $P_i$ and the "recall" pulse $P_r$ separated by a time interval T is applied to the spin-echo sample which after another time interval T, a spin-echo signal appears. In the aforementioned cross-referenced application, U.S. Ser. No. 173,491, entitled "Spin Echo Frequency Hopping," there was disclosed the means by which spin-echo apparatus can be used as a matched filter element in a frequency diversity pulsed radar. Such a system is similar to the subject embodiment shown in FIG. 1 with the exception that in the former one spin-echo element was utilized whereas in the present invention a plurality of spin-echo elements are utilized.

Figure 2:
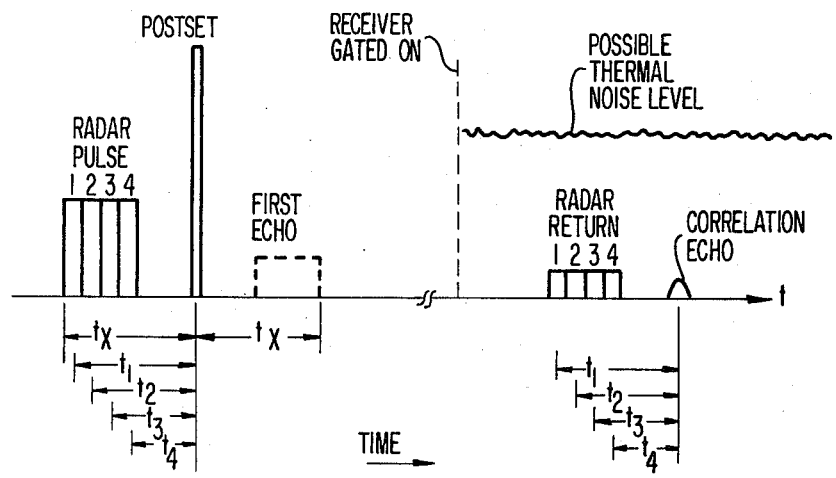
FIG. 2 is a waveform diagram illustrative of the operation of prior art apparatus.

Referring now to FIG. 2, generally a relatively small portion of the radar transmitter pulse, shown comprising four equal time segments for purposes which will be subsequently explained, is fed into a spin-echo matched filter element and then after a time period $t_r$ a post-set RF pulse, i.e., one having a bandwidth which is flat over the frequency spectrum of the transmitted radar pulse was fed into the matched filter element. A first spin-echo signal is produced after a second time period $t_r$. The first echo and transmitted radar pulse are mirror imaged about the post-set pulse. However, since this corresponds to near range targets, the receiver is normally gated off until a predetermined time thereafter when the desired radar return signal would be present. Upon the reception of the desired radar return signal, it is coupled to the spin-echo matched filter element causing a correlation echo waveform to be produced after a corresponding time period $t_r$. What is significant, however, is that during the total time the receiver is gated on, there is thermal noise within the RF signal bandwidth which is incident upon the spin-echo element which has an erasure effect providing degradation of the correlation process. Moreover, there will be a certain amount of noise power which is leaking through the video detector which can mask the echo signal.

Figure 3:
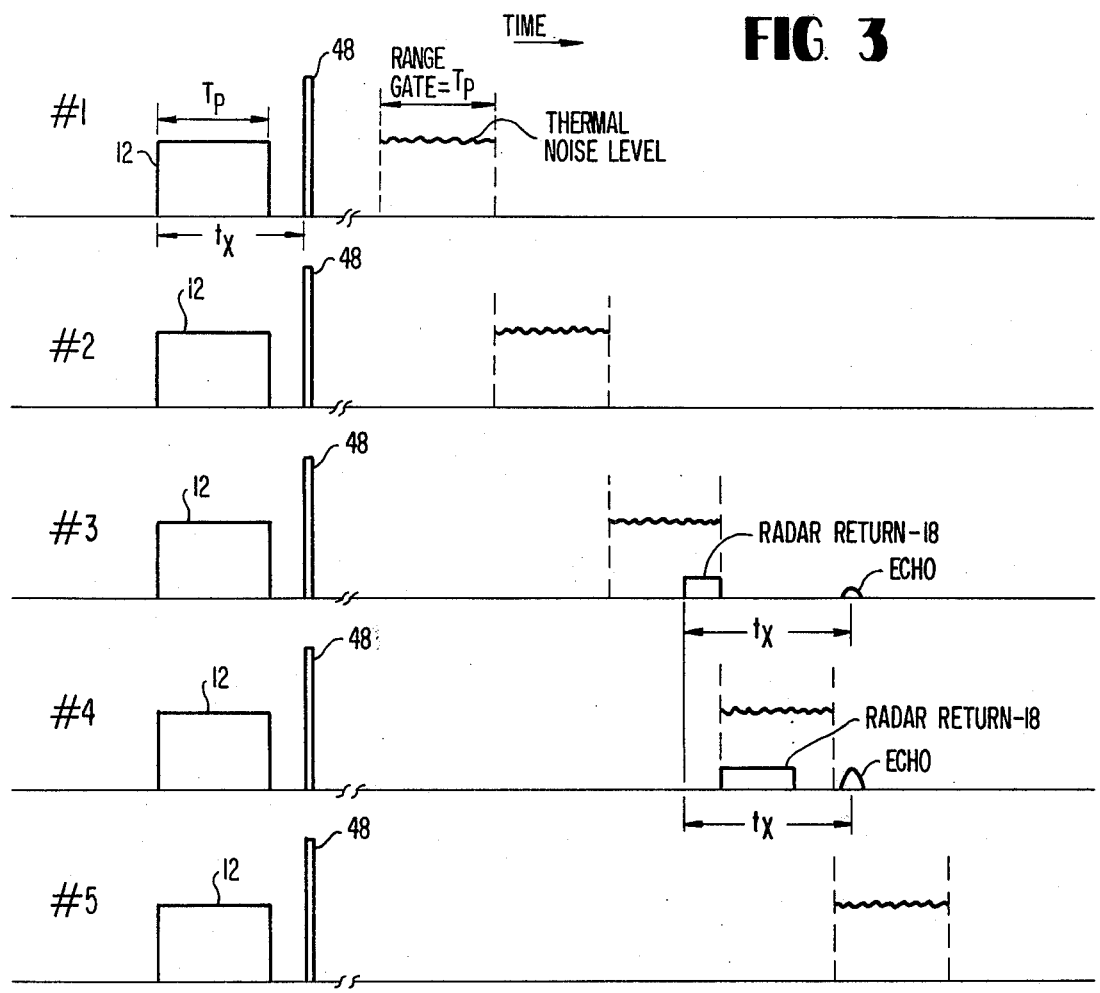
FIG. 3 is a set of waveform diagrams illustrative of the operation of the subject invention.

Referring now to the operation of the subject invention which can best be understood in light of the waveform shown in FIG. 3, a portion of the radar transmitted pulse 12 is coupled to the waveguide transmission line 24 by means of the coupler 26. The synchronizer 14, meanwhile, triggers the timer circuit 20 which activates all of the microwave switches $22_1$ . . . $22_n$ which close coupling RF energy simultaneously to all of the samples $40_1$ . . . $40_n$ through the respective circulators $34_1$ . . . $34_n$. Following this, the microwave switches remain closed and a wide bandwidth post-set pulse 48 is generated by the RF source 46. The post-set pulse is coupled to the microwave transmission line 24 by means of the coupler 50. The post-set pulse RF signal is again simultaneously coupled to all of the spin-echo samples $40_1$ . . . $40_n$ which are thereby set. Following this the timer 20 opens all of the microwave switches $22_1$, $22_2$, etc. uncoupling waveguide cavities 36, etc., from the waveguide 24. The receiver 32 meanwhile has been gated off. Next, the timer circuit 20 sequentially recloses each of the microwave switches $22_1$, $22_2$, $22_3$ . . . $22_n$ for predetermined non-overlapping time periods $T_p$ which are substantially equal to the pulsewidth of the radar pulse 12. Each of the switches then are operated during a portion of the radar return time and thus each time period $T_p$ corresponds to predetermined different equal range segments and therefore the plurality of spin-echo elements are said to be range gated.

Accordingly, as each of the microwave switches $22_1$ . . . $22_n$ are again gated on or closed in turn, there comes a time when the radar return pulse 18 appears. Taking the simplest case where, for example, one of the microwave switches $34_1$ is again closed simultaneously with the occurrence of the radar return pulse 18, it will be coupled to the respective spin-echo element 36, causing a correlation echo waveform to be produced after a time $t_r$. The thermal noise level however is only incident upon the respective spin-echo sample $40_1$ during the respective range gate period $T_p$. Thereafter, microwave switch $22_1$ is again rendered open. It is to be noted that the correlation echo occurs after microwave switch $22_1$ has again been rendered open. Thus the noise is turned off or blocked when the correlation echo signal appears and is coupled to the receiver 32. The worst case is shown in FIG. 3 wherein the radar return pulse 18 appears during the latter portion of the range gate $T_p$ for spin-echo filter No. 3 and the beginning of the range gate period $T_p$ for spin-echo element No. 4. However, both correlation echoes still occur at exactly the same time which can be recombined at the receiver 32. The reason for this is shown in FIG. 2. The transmitted radar pulse can be thought of as divided into a plurality of time segments or bits of information. Four (4) segments are shown in FIG. 2 for purposes of explanation. Each bit in the radar pulse produces its own echo at a time which is directly related to the time difference between the corresponding bit in the transmitted pulse and the post-set pulse, i.e., all of the individual echoes which are generated by each bit must occur at the same time as shown by No. 3 and No. 4 of FIG. 3. This phenomenon is well known to those skilled in the art of spin-echo technology.

Thus each spin echo element will only be effected by the noise which is incident thereto during its respective range gate period $T_p$ which is substantially the same noise figure for conventional type of matched filters utilized in radar applications. The number of spin-echo filter elements required is determined by the expression:

$$N = (\text{radar search time}/T_p)$$

Typically, this number $N$ can be anywhere between 5 and 100; however, in most applications $N$ is equal to 5, which is a reasonable increase in hardware for circumventing the noise problem associated with prior art apparatus.

Having thus described by way of example what is considered at present to be the preferred embodiment of the subject invention, we claim as our invention:

1. A matched filter system for providing signal correlation of an RF signal, comprising in combination:
   means for generating and transmitting RF pulses and receiver means for receiving RF echo pulses from a target as a result of said RF pulse;
   an RF pulse generator coupled to receive a portion of said RF pulse, said pulse generator being actuated by said portion of said RF pulse after a predetermined time delay to provide a second pulse for spin-echo apparatus;
   a plurality of spin-echo elements, each including respective microwave cavity means located in a cryogenic atmosphere and a paramagnetic spin-echo sample situated in said cavity means;
   circuit means for selectively coupling each spin-echo element to said RF pulse, said second pulse and said echo pulses;
   control circuit means coupled to and operating said circuit means to first couple all said spin-echo elements to receive said RF and said second pulse for a first predetermined time period thereby setting the spin system to the transmitted pulse, and subsequently thereafter sequentially coupling each spin-echo element to receive portions of said echo pulses for a predetermined relatively short time interval corresponding to a range gate, whereupon at least one spin-echo element will be responsive to said RF echo pulse to produce a correlated spin-echo signal therefrom; and
   receiver means coupled to all said spin-echo apparatus for receiving as an input said spin-echo signal produced thereby.

2. The apparatus as defined by claim 1 wherein said circuit means comprises microwave switches and said control circuit means comprises a timing circuit.

3. The apparatus as defined by claim 2 and additionally including microwave circulator means coupled between each microwave switch means and a respective spin-echo element, and additionally including transmission line means coupling each circulator means to said receiver means.

4. The apparatus as defined by claim 3 wherein said transmitting and receiving means additionally includes a synchronizer coupled to said RF pulse generator for assuring that said RF pulse generator only generates one pulse for each of said RF pulses.

5. The apparatus as defined by claim 4 and additionally including a time delay circuit for coupling a portion of each of said RF pulses to said RF pulse generator means for effecting a predetermined time delay between said portion of the transmitted RF pulse and the associated pulse generated by said pulse generator.

6. The apparatus as defined by claim 5 wherein each spin-echo apparatus includes a paramagnetic spin-echo sample selectively doped for producing spin-echo signals without the need for an external magnetic field.

7. The apparatus as defined by claim 6 wherein said spin-echo sample comprises nickel doped titanium dioxide.

8. The apparatus as defined by claim 7 and additionally including gating circuit means coupled between said synchronizer and said receiver means.

* * * * *